US009903060B2

(12) United States Patent
Didat et al.

(10) Patent No.: US 9,903,060 B2
(45) Date of Patent: Feb. 27, 2018

(54) INDUCTION MOTOR TEMPERATURE MEASUREMENT USING PHASE CONTROLLED ALTERNATING CURRENT

(71) Applicant: General Electric Company, Schenectady, NY (US)

(72) Inventors: Mark Anthony Didat, Floyds Knobs, IN (US); Richard Dean Suel, II, Louisville, KY (US); Scott Michael Gelber, Athens, AL (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 42 days.

(21) Appl. No.: 14/595,244

(22) Filed: Jan. 13, 2015

(65) Prior Publication Data

US 2016/0201245 A1 Jul. 14, 2016

(51) Int. Cl.

| | |
|---|---|
| ***H02P 1/26*** | (2006.01) |
| ***D06F 37/30*** | (2006.01) |
| ***G01K 7/16*** | (2006.01) |
| ***H02P 29/60*** | (2016.01) |
| ***H02H 7/085*** | (2006.01) |

(52) U.S. Cl.

CPC ............ *D06F 37/304* (2013.01); *G01K 7/16* (2013.01); *H02H 7/0852* (2013.01); *H02P 1/26* (2013.01); *H02P 29/60* (2016.02); *G01K 2207/00* (2013.01); *G01K 2217/00* (2013.01)

(58) Field of Classification Search

CPC ........................................................ H02P 3/18
USPC ........................................ 318/798, 767, 727
See application file for complete search history.

(56) References Cited

U.S. PATENT DOCUMENTS

| | | | | |
|---|---|---|---|---|
| 6,163,129 | A | 12/2000 | Younger et al. | |
| 6,262,550 | B1 * | 7/2001 | Kliman | G05B 23/0264 318/565 |
| 6,747,435 | B2 | 6/2004 | Yang et al. | |
| 8,981,699 | B2 * | 3/2015 | Obata | G01R 31/1227 318/490 |
| 9,160,272 | B2 * | 10/2015 | Tachibana | H02P 6/08 |

* cited by examiner

*Primary Examiner* — David S Luo
(74) *Attorney, Agent, or Firm* — Dority & Manning, P.A.

(57) ABSTRACT

Methods and systems are provided for monitoring current flow in an induction motor, particularly an induction motor associated with a washing machine and for controlling operation of the motor to limit thermals during operation of the motor. The subject matter provides for periodically stopping the motor and applying a phase limited alternating (AC) voltage to the motor that is of insufficient magnitude to start the motor rotating. A current reading is taken and converted using a look up table to a corresponding temperature. If the temperature exceeds a predetermined amount, temperature fold back procedures are initiated the may include shortening and/or pausing certain washer operations.

16 Claims, 5 Drawing Sheets

INDUCTION MOTOR TEMPERATURE MEASUREMENT USING PHASE CONTROLLED ALTERNATING CURRENT

FIELD OF THE INVENTION

The present subject matter relates to home appliances. More particularly, the present subject matter relates to methods for measuring the motor temperature of a line fed induction motor.

BACKGROUND OF THE INVENTION

Recently interest has been increasing in the development of methods for controlling motor temperature in certain appliances. For example, management of drive motor thermals has been found to be of significant importance for laundry appliance performance. Such temperature management processes are, however, difficult in the absence of a convenient method to measure motor temperature.

Previous efforts to monitor motor temperature have involved inclusion of a motor temperature sensor that is designed to "trip" to disconnect the motor from its power source upon reaching a predetermined temperature. Other processes have been developed that include injection of a direct current (DC) into the motor windings to measure motor winding resistance as it varies with temperature. This DC injection method, however, is not available in a line fed AC drive system absent addition of a DC power supply and additional control circuitry. Another challenge with using AC excitation is that the motor generally needs to be static. This is typically achieved by exciting both windings of a split phase AC motor without the normal starting capacitor in circuit thereby reducing the start torque to nearly zero.

While these techniques may be effective, there are additional disadvantages and complications in implementing such a system. Thus, a need exists for a system and method for monitoring motor temperature during an operational cycle of a laundry machine. By so doing certain disadvantages including, for example, the tripping of a motor thermal protection device with its consequent lengthy reset time further delaying completion of the laundry cycle may be avoided.

BRIEF DESCRIPTION OF THE INVENTION

Aspects and advantages of the invention will be set forth in part in the following description, or may be obvious from the description, or may be learned through practice of the invention.

The present subject matter relates to a method for monitoring induction motor temperature. According to such method a phase limited alternating current (AC) voltage is applied to the motor which is inadequate to provide starting torque for the motor and measuring current flow through the motor. The method further provides for converting the measure current flow to a corresponding temperature.

The preset subject matter also relates to a washing machine comprising a cabinet, a wash tub within the cabinet, an agitator within the wash tub, and an induction motor configured as a drive mechanism for the wash tub and agitator. The washing machine in accordance with this embodiment also includes a control system configured to control the induction motor to perform washing cycles and a current sensor configured to monitor current flow through the induction motor and to supply a signal corresponding to measured current flow to the control system. Further in accordance with such embodiment the control system is configured to apply a phase limited alternating current (AC) voltage to the induction motor, to convert the signal corresponding to measured current to a corresponding induction motor temperature, and to initiating temperature fold back procedures if the induction motor temperature exceeds a predetermined temperature.

The present subject matter also relates to an induction motor having a start winding, a run winding, a start switch, a run switch, a control system and a current sensor coupled to the control system and to at least one of the start and run windings for measuring current flow there through and sending a signal representative of measured current to the control system. Further the control system of this embodiment is configured for selectively supplying a phase limited voltage to at least one of the start and run windings that is inadequate to provide starting torque for the motor and is further configured to convert the signal representative of measured current to a signal representative of motor temperature and to initiate temperature fold back procedures when the signal representative of motor temperature exceeds a predetermined level.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
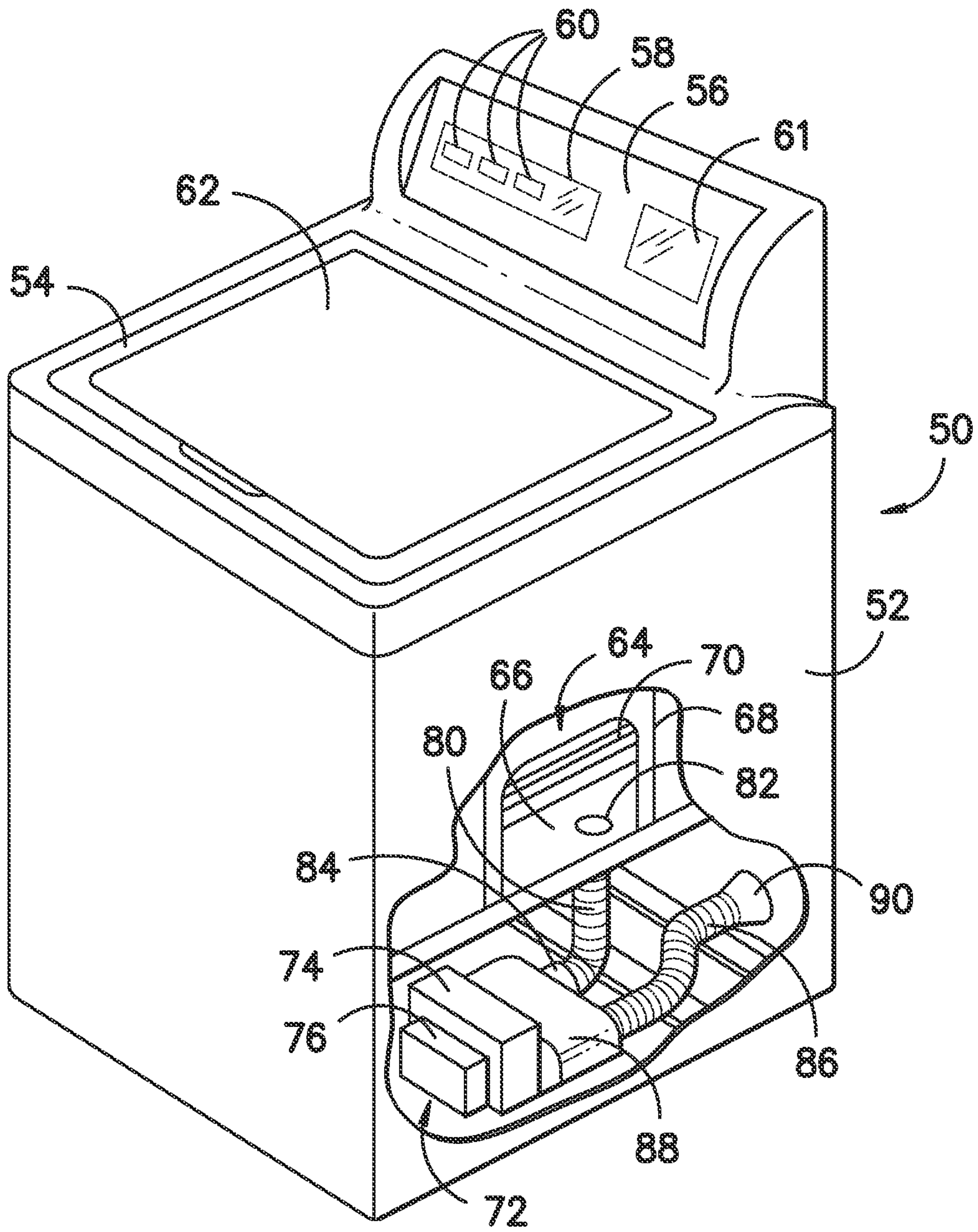
FIG. 1 provides a perspective view of a washing machine according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to methods for measuring the motor temperature of a line fed induction motor using phase controlled AC excitation and current measurement. More particularly, the present subject matter is directed to methods for monitoring the temperature of a drive motor within a washing machine during selected operational cycles of the machine and implementing temperature fold back procedures to manage motor thermals.

With initial reference to FIG. 1 there is illustrated a perspective view partially broken away of an exemplary washing machine 50 including a cabinet 52 and a cover 54 in which the present subject matter may be employed. A backsplash 56 extends from cover 54, and a control panel 58 including a plurality of input selectors 60 is coupled to backsplash 56. Control panel 58 and input selectors 60 collectively form a user interface input for operator selection of machine cycles and features, and in one embodiment a display 61 indicates selected features, a countdown timer, and other items of interest to machine users. A lid 62 is mounted to cover 54 and is rotatable about a hinge (not shown) between an open position (not shown) facilitating access to a wash tub 64 located within cabinet 52, and a closed position (shown in FIG. 1) forming a sealed enclosure over wash tub 64.

As illustrated in FIG. 1, washing machine 50 is a vertical axis washing machine. While the present disclosure is discussed with reference to a vertical axis washing machine, those of ordinary skill in the art, using the disclosures provided herein, should understand that the subject matter of the present disclosure is equally applicable to other washing machines, such as horizontal axis washing machines.

Tub 64 includes a bottom wall 66 and a sidewall 68, and a basket 70 is rotatably mounted within wash tub 64. A pump assembly 72 is located beneath tub 64 and basket 70 for gravity assisted flow when draining tub 64. Pump assembly 72 includes a pump 74 and a motor 76. A pump inlet hose 80 extends from a wash tub outlet 82 in tub bottom wall 66 to a pump inlet 84, and a pump outlet hose 86 extends from a pump outlet 88 to an appliance washing machine water outlet 90 and ultimately to a building plumbing system discharge line (not shown) in flow communication with outlet 90.

Figure 2:
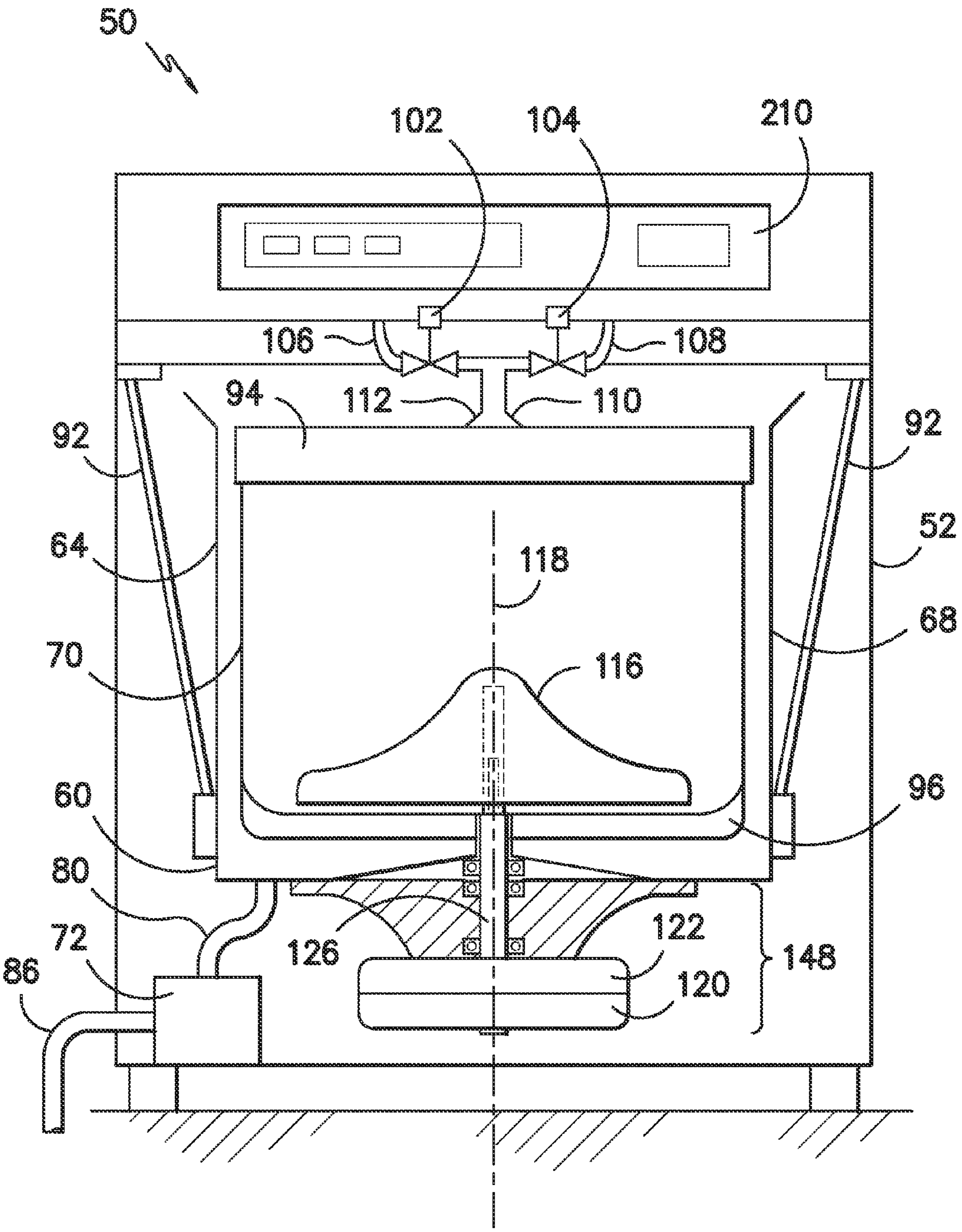
FIG. 2 provides a side elevation schematic view of the washing machine of FIG. 1.

FIG. 2 is a front elevational schematic view of washing machine 50 including wash basket 70 movably disposed and rotatably mounted in wash tub 64 in a spaced apart relationship from tub side wall 68 and tub bottom (not shown). Basket 70 includes a plurality of perforations therein to facilitate fluid communication between an interior of basket 70 and wash tub 64.

A hot liquid valve 102 and a cold liquid valve 104 deliver fluid, such as water, to basket 70 and wash tub 64 through a respective hot liquid hose 106 and a cold liquid hose 108. Liquid valves 102, 104 and liquid hoses 106, 108 together form a liquid supply connection for washing machine 50 and, when connected to a building plumbing system (not shown), provide a fresh water supply for use in washing machine 50. Liquid valves 102, 104 and liquid hoses 106, 108 are connected to a basket inlet tube 110, and fluid is dispersed from inlet tube 110 through a known nozzle assembly 112 having a number of openings therein to direct washing liquid into basket 70 at a given trajectory and velocity. A known dispenser (not shown in FIG. 2), may also be provided to produce a wash solution by mixing fresh water with a known detergent or other composition for cleansing of articles in basket 70.

A known agitation element 116, such as a vane agitator, impeller, auger, or oscillatory basket mechanism, or some combination thereof is disposed in basket 70 to impart an oscillatory motion to articles and liquid in basket 70. In different embodiments, agitation element 116 may be a single action element (i.e., oscillatory only), double action (oscillatory movement at one end, single direction rotation at the other end) or triple action (oscillatory movement plus single direction rotation at one end, singe direction rotation at the other end). As illustrated in FIG. 2, agitation element 116 is oriented to rotate about a vertical axis 118.

Basket 70 and agitator 116 are driven by a motor 120 through a transmission and clutch system 122. In an exemplary embodiment, motor 120 is a polyphase variable speed motor. The motor 120 drives output shaft 126 to rotate basket 70 within wash tub 64. Clutch system 122 facilitates driving engagement of basket 70 and agitation element 116 for rotatable movement within wash tub 64, and clutch system 122 facilitates relative rotation of basket 70 and agitation element 116 for selected portions of wash cycles. Motor 120 and transmission and clutch system 122 collectively are referred herein as a machine drive system 148.

Basket 70, tub 64, and machine drive system 148 are supported by a vibration dampening suspension system 92. The damping system 92 can include a plurality of damping elements, such as piston-cylinder damping elements, coupled to the wash tub 64. The suspension system 92 can include other elements, such as a balance ring 94 disposed around the upper circumferential surface of the wash basket 70. The balance ring 94 can be used to counterbalance any out of balance condition for the wash machine as the basket 70 rotates within the wash tub 64. The wash basket 70 could also include a balance ring 96 located at a lower circumferential surface of the wash basket 70.

Suspension system 92 operates to dampen dynamic forces as the wash basket 70 rotates within the wash tub 64. The suspension system 92 has various natural operating frequencies of the dynamic system. These natural operating frequencies are referred to as the modes of suspension for the washing machine. For instance, the first mode of suspension for the washing machine occurs when the dynamic system including the wash basket 70, tub 64, and suspension system 92 are operating at the first resonant or natural frequency of the dynamic system. The second mode of suspension for the washing machine occurs when the dynamic system including the wash basket 70, tub 64, and suspension system 92 are operating at the second resonant or natural frequency of the dynamic system.

Operation of machine 50 is controlled by a controller 210 which is operatively coupled to the user interface input located on washing machine backsplash 56 (shown in FIG. 1) for user manipulation to select washing machine cycles and features. In response to user manipulation of the user interface input, controller 210 operates the various components of machine 50 to execute selected machine cycles and features.

In an illustrative embodiment, laundry items are loaded into basket 70, and washing operation is initiated through operator manipulation of control input selectors 60 (shown in FIG. 1). Tub 64 is filled with water and mixed with detergent to form a wash fluid, and basket 70 is agitated with agitation element 116 for cleansing of laundry items in basket 70. That is, agitation element is moved back and forth in an oscillatory back and forth motion. In the illustrated embodiment, agitation element 116 is rotated clockwise a specified amount about the vertical axis of the machine, and then rotated counterclockwise by a specified amount. The clockwise/counterclockwise reciprocating motion is sometimes referred to as a stroke, and the agitation phase of the wash cycle constitutes a number of strokes in sequence. Acceleration and deceleration of agitation element 116 during the strokes imparts mechanical energy to articles in basket 70 for cleansing action. The strokes may be obtained in different embodiments with a reversing motor, a reversible clutch, or other known reciprocating mechanism.

After the agitation phase of the wash cycle is completed, tub 64 is drained with pump assembly 72. Laundry items are then rinsed and portions of the cycle repeated, including the agitation phase, depending on the particulars of the wash cycle selected by a user.

Figure 3:
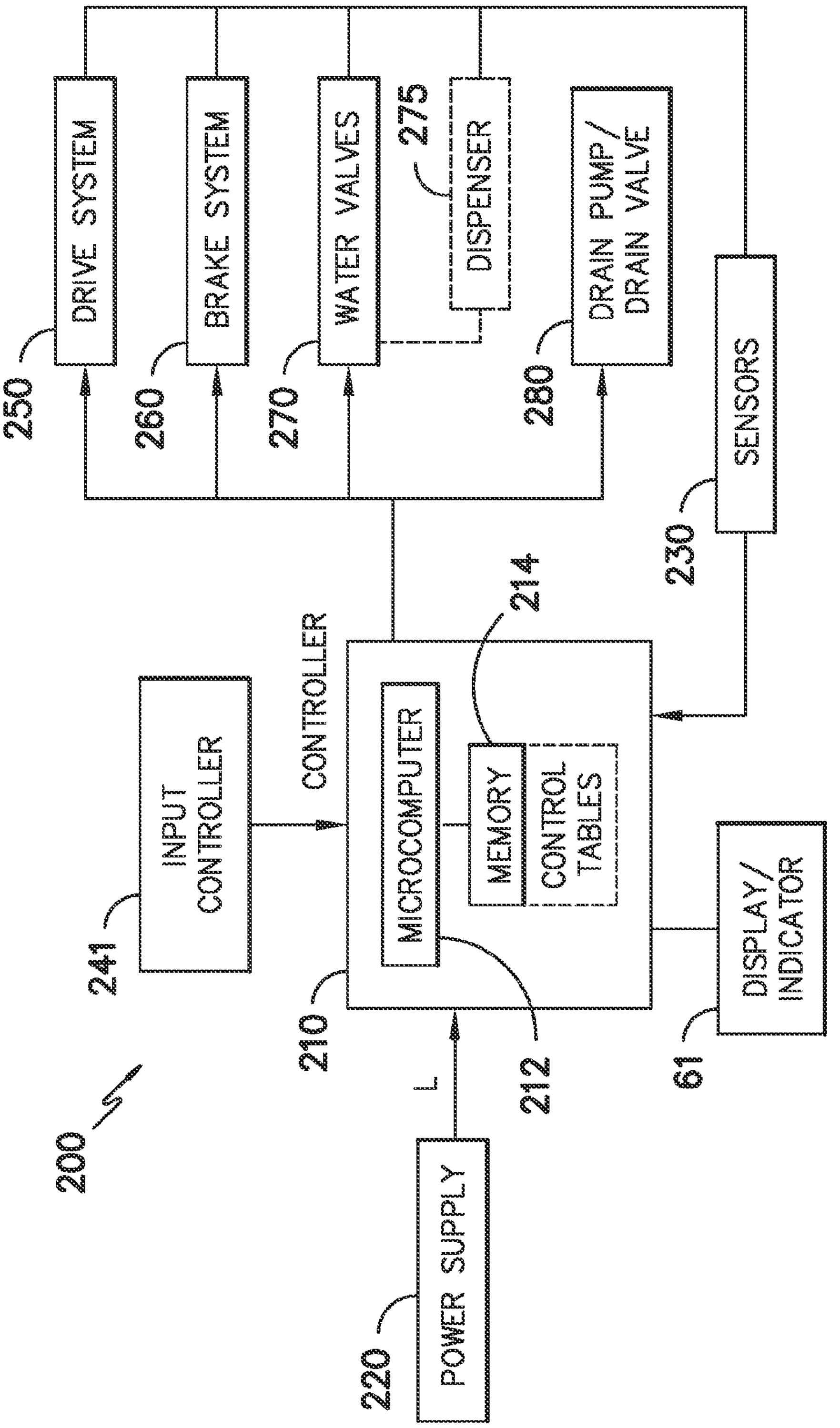
FIG. 3 provides of block diagram of an exemplary control system for a washing machine according to an exemplary embodiment of the present subject matter.

FIG. 3 is a schematic block diagram of an exemplary washing machine control system 200 for use with washing machine 50 (shown in FIGS. 1 and 2). Control system 200 includes controller 210 which may, for example, be a microcomputer 212 coupled to a user interface input 241. An operator may enter instructions or select desired washing machine cycles and features via user interface input 241, such as through input selectors 60 (shown in FIG. 1) and a display or indicator 61 coupled to microcomputer 212 displays appropriate messages and/or indicators, such as a timer, and other known items of interest to washing machine users. A memory 214 is also coupled to microcomputer 212 and stores instructions, calibration constants, and other information as required to satisfactorily complete a selected wash cycle. Memory 214 may, for example, be a random access memory (RAM). In alternative embodiments, other forms of memory could be used in conjunction with RAM memory, including but not limited to flash memory (FLASH), programmable read only memory (PROM), and electronically erasable programmable read only memory (EEPROM).

Power to control system 200 is supplied to controller 210 by a power supply 220 configured to be coupled to a power line L. Analog to digital and digital to analog converters (not shown) are coupled to controller 210 to implement controller inputs and executable instructions to generate controller output to washing machine components such as those described above in relation to FIGS. 1 and 2. More specifically, controller 210 is operatively coupled to machine drive system 250 (e.g., motor, inverter drive, mode shifter, etc.), a brake assembly 260 associated with basket 70, machine water valves 270 (e.g., valves 102, 104 shown in FIG. 2) and machine drain system 280 (e.g., drain pump assembly 72 and/or drain valve 130 shown in FIG. 2) according to known methods. In a further embodiment, water valves 270 are in flow communication with a dispenser 275 (shown in phantom in FIG. 3) so that water may be mixed with detergent or other composition of benefit to washing of garments in wash basket 70.

In response to manipulation of user interface input 241, controller 210 monitors various operational factors of washing machine 50 with one or more sensors or transducers 230, and controller 210 executes operator selected functions and features according to known methods. Of course, controller 210 may be used to control washing machine system elements and to execute functions beyond those specifically described herein. Controller 210 operates the various components of washing machine 50 in a designated wash cycle familiar to those in the art of washing machines.

Figure 4:
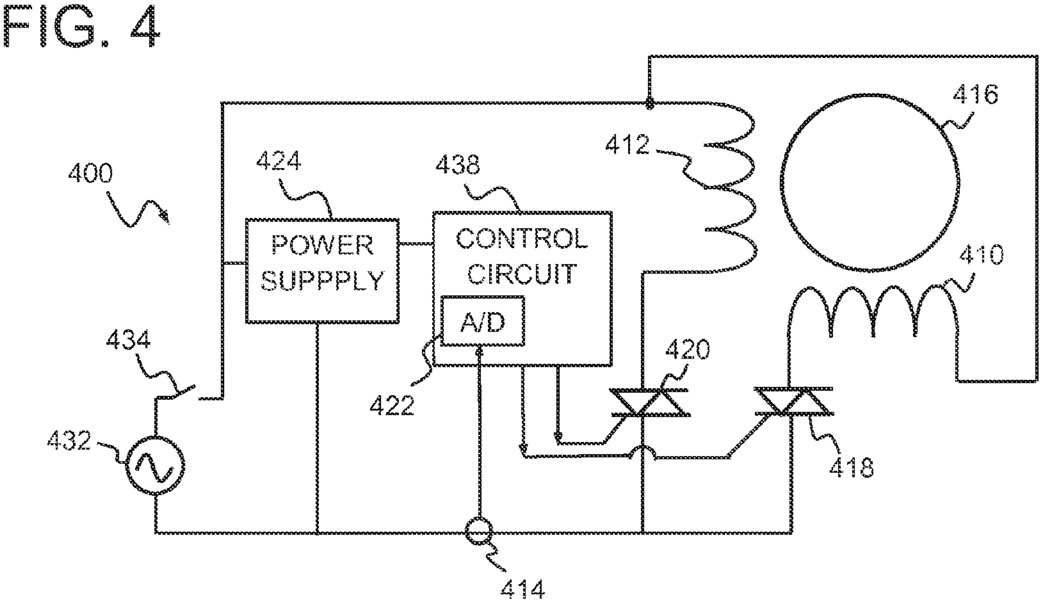
FIG. 4 provides a schematic of an exemplary control system according to an exemplary embodiment of the present subject matter.

FIG. 4 depicts a schematic of an exemplary drive control system 400 corresponding generally to drive control system 250 of FIG. 3. More particularly, FIG. 4 illustrates a circuit diagram of one embodiment of an electronic start motor and associated circuitry as may be used to implement the present subject matter. As part of a stator, a start winding 410 is coupled in parallel with a run winding 412 for providing torque to a rotor 416. In the presently illustrated embodiment both windings are further coupled to a power supply 424 through a control circuit 438. Power supply 424 is configured to receive an input voltage from AC source 432, such as 110 volts, through a switch 434, and to supply a DC voltage to control circuit 438 to provide operating power for control circuit 438 in a manner similar to that of power supply 220 of FIG. 3 supplying operating power to controller 210 as described herein above.

Start winding 410 and run winding 412 are coupled to control circuit 438 through switches shown as start Triac 418 and run Triac 420. Triacs are useful because they are inexpensive and are switched off when the load current is close to zero (a feature which decreases complexity in the circuit). The illustration of Triacs, however, is for example only; other switches which can operate quickly, such as, but not limited to field effect transistors, and back to back SCR configurations can alternatively be used, if desired. In an alternate embodiment start winding 410 may be couple to a capacitor to provide the phase shift necessary for starting the motor and Triac 418 or other switch types may be used to connect and disconnect start winding 410 to and from power source 432.

A current sensor 414 is coupled to the start and run windings 410, 412 by way of being placed in the common power line connecting the windings to power source 432. In one embodiment, the current sensor may correspond to a resistor of appropriate size, such as 0.1 ohm, coupled to control circuit 438, for example, in a configuration which measures the voltage drop across the resistor. In some embodiments, current sensor 414 is coupled to a portion of the control circuit containing an analog-to-digital (A/D) converter 422, to convert the voltage across the resistor to a digital voltage signal. Alternatively, current sensor 414 may correspond to a current transformer coupled to the common power line connecting Triacs 418, 420 to power source 432. Other current sensors including Hall effect type devices may be employed. It should be appreciated that control circuit 438 may be implemented as a portion of controller 210 as illustrated in FIG. 3 or may correspond to a separate entity. The presently described embodiment assumes that control circuit 438 is implemented within controller 210 and has access to all of its components including microcomputer 212 and memory 214.

In accordance with the present subject matter, a method has been developed to measure motor temperature of a line-fed induction motor as illustrated in FIG. 4 using phase controlled AC excitation and current measurement. In particular, the present method has been developed to monitor the operating temperature of a line-fed induction motor provided as a drive motor in a washing machine. In accordance with the present subject matter, it has been found that during selected operational periods of a washing machine cleaning cycle, the drive motor may be temporarily stopped and then operated in a mode such that the motor will not develop sufficient starting torque to rotate the motor rotor yet measurable current will flow through the motor windings to permit AC current measurement.

Figure 5A:
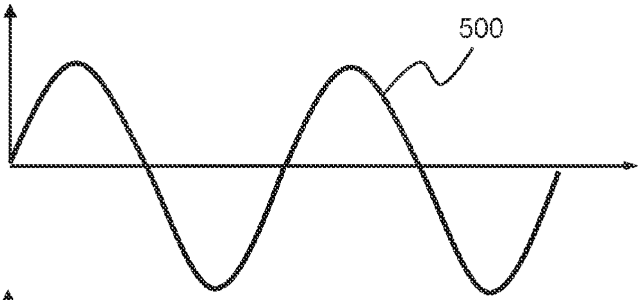
FIGS. 5A, 5B, and 5C illustrate waveforms useful in explaining operation of the present subject matter.
Figure 5B:
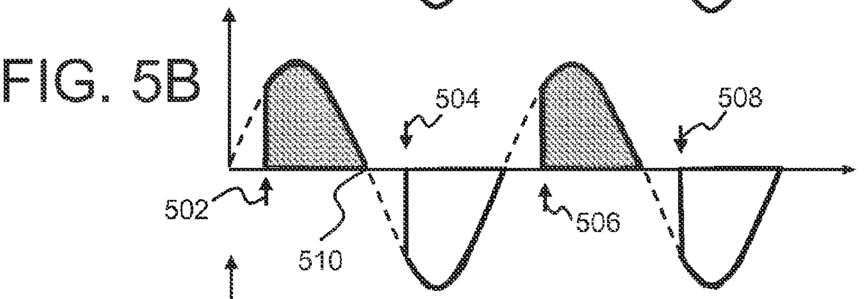

With reference to FIG. 5A, there is illustrated a waveform 500 corresponding to the AC waveform produced by source 432 that may be controllably applied to start and run windings 410, 412 by way of Triacs 418, 420, respectively, under the control of control circuit 438. As is well understood, Triacs will, when gated on, conduct until the applied voltage is reduced to zero. For example, as illustrated in FIG. 5B, a Triac gated on at time periods illustrated by arrows 502, 504, 506, 508 will cause a Triac to conduct until the input voltage crosses a zero point representatively illustrated as zero crossing 510. The waveform illustrated in FIG. 5B corresponds to a waveform as may be applied to the run winding 412 during a period where the motor rotor is turning and driving components of the washer.

Figure 5C:
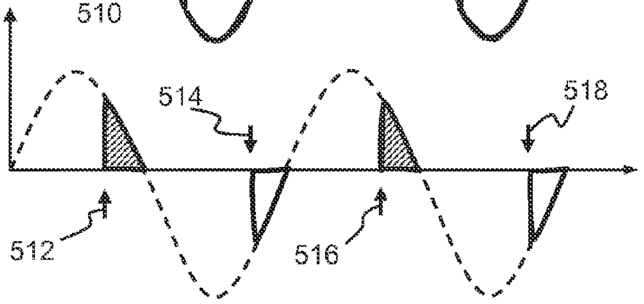

In accordance with the present subject matter, during certain wash cycle periods, for example the agitation period, a phase limited AC voltage will be applied to the motor as, for example, illustrated in FIG. 5C. As illustrated in FIG. 5C, the Triacs are triggered later in the AC cycle as depicted at arrows 512, 514, 516, 518 so that the phase duration and thus the effective applied voltage will be of a magnitude that will provide inadequate start torque so that the motor will not rotate. During this period an AC current measurement may be taken and the data from such measurement can then be used to query a look up data table that may be stored in memory 214 (FIG. 3) to ascertain motor temperature. Since the motor is not rotating the reactive component of the impedance will be small and will consistently yield a result similar to those using a DC injection method as previously described.

A significant aspect of the present subject matter resides in the ability to take motor temperature readings during a portion of the wash cycle. This ability allows the control system to apply temperature fold back methods to manage motor temperature. For example, if the control system determines during the agitation period that the motor temperature exceeds a predetermined level, modifications may be made to the agitation period to afford an opportunity for the motor to cool.

One fold back method might involve shortening the agitation stroke while another might provide for pausing the agitation for a first period of time while a still further might provide for pausing the agitation for a second period of time longer than the first period of time. It should also be apparent to those of ordinary skill in the art that these methods may be used in combination where, for example, a first fold back process might be to shorten the agitation stroke and if this is found to not produce the desire fold back level, one or more pauses for a the first time period might be initiated fold by one or more pauses for the second time period if necessary.

Through the implementation of such temperature fold back methods, the risk of exceeding the motor's temperature cutoff (TCO) limit is reduced. General testing has shown that cool down times for motors that have exceeded their TCO limit may be as much as 45 minutes before the TCO device resets. Such a delay in operation would be a significant source of customer dissatisfaction and a potential source of increased service call rate (SCR) for the appliance. Implementation of the present subject matter provides significant improvement in both these issues.

Figure 6:
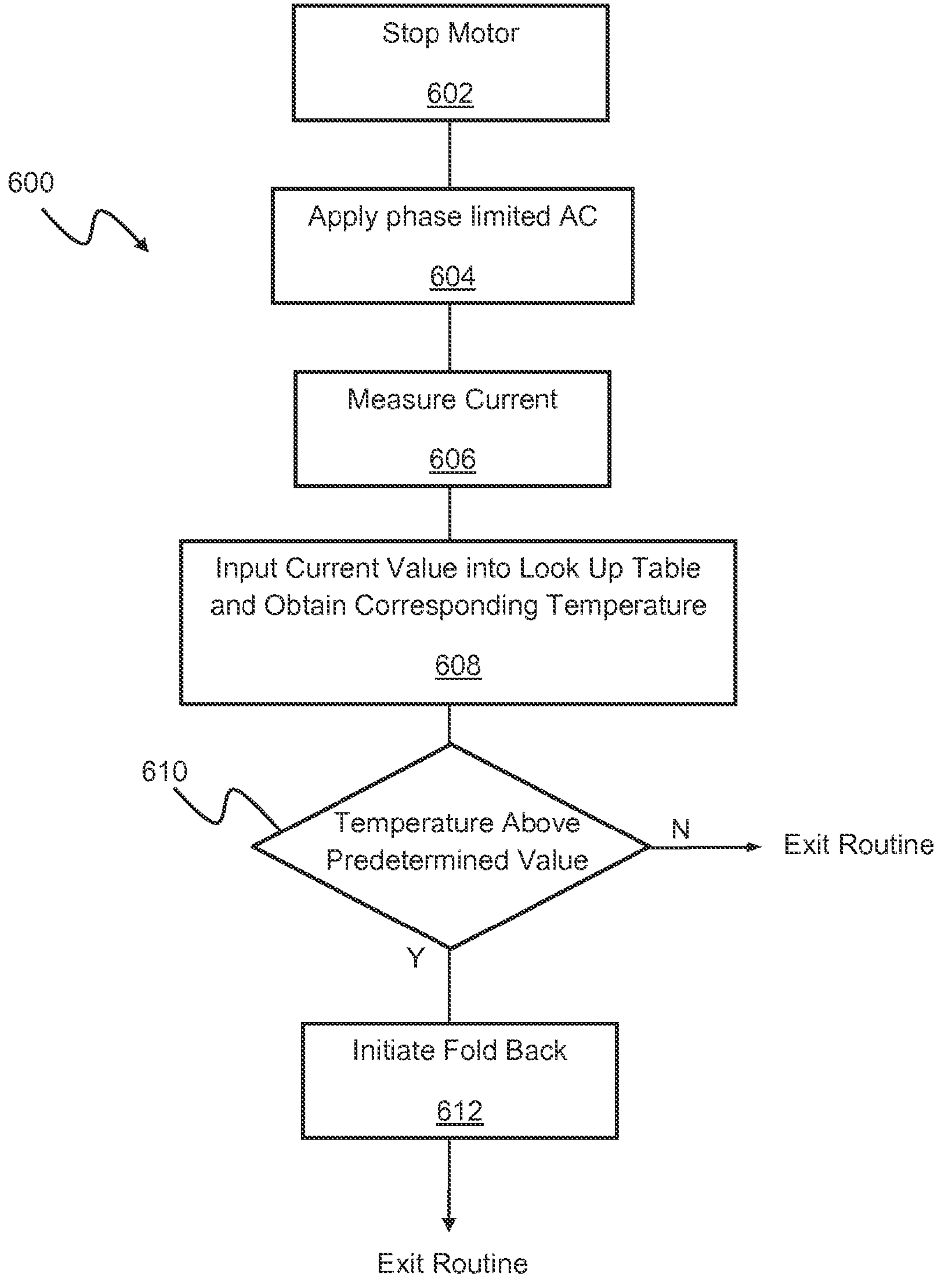
FIG. 6 is a flow chart illustrating steps for implementing the present subject matter.

With reference to FIG. 6, there is illustrated a flow chart 600 illustrating steps for implementing the present subject matter. It should be appreciated that flow chart 600 may represent a subroutine that may be embedded with an overall control system program and configured to be called periodically or during selected portions of the washing machine's complete washing cycle. For illustration only the method is shown to be a portion of the agitation portion of the washing machine's complete washing cycle but it should be apparent to those of ordinary skill in the art that the present subject matter may be equally applicable and implementable in association with other portions of the complete washing cycle.

In accordance with an exemplary method of the present subject matter, at step 602 the induction motor, if already running, may be stopped. At step 604 a phase limited AC voltage may be applied to one or more of the motor windings at a level that is insufficient to cause the motor to start running, that is, the motor rotor to start rotating. Such a level of energization of the motor windings will provide a current flow through the windings that, at step 606, may be measured by a current sensor.

At step 608 the current level determined at step 606 is used as an input to a look up table store in a memory that cross references current readings with operating temperature readings for the induction motor. This information is easily obtained through experimentation and will change depending on the particular motor. At step 610 the temperature provided by the look up table will be compared against a predetermined level to determine if the motor temperature is high enough to initiate temperature fold back procedures to assist in cooling the motor. If the motor temperature is at or above a first level, as determined at step 610, a temperature fold back procedure may be initiated at step 612. The routine may then return to the main program to be called again periodically to continue monitoring the motor temperature.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for monitoring induction motor temperature, comprising:

applying a phase limited alternating current (AC) voltage to the motor, wherein the applied phase limited AC voltage is inadequate to provide starting torque for the motor;

measuring current flow through the motor;

converting the measure current flow to a corresponding temperature; and initiating temperature fold back procedures if the motor temperature exceeds a predetermined temperature.

2. The method as in claim 1, wherein converting comprise querying a look up data table to ascertain motor temperature.

3. The method as in claim 1, wherein initiating temperature fold back procedures comprises modifying motor operation.

4. The method as in claim 1, wherein initiating temperature fold back procedures comprises pausing motor operation.

5. A washing appliance, comprising:

a cabinet;

a wash tub within said cabinet;

an agitator within said wash tub;

an induction motor configured as a drive mechanism for said wash tub and said agitator;

a control system configured to control said induction motor to perform washing cycles; and a current sensor configured to monitor current flow through said induction motor and to supply a signal corresponding to measured current flow to said control system, wherein said control system is further configured to apply a phase limited alternating current (AC) voltage to said induction motor, to convert said signal corresponding to measured current to a corresponding induction motor temperature, and to initiating temperature fold back procedures if the induction motor temperature exceeds a predetermined temperature.

6. The washing appliance of claim 5, wherein the applied phase limited AC voltage is inadequate to provide starting torque for said induction motor.

7. The washing appliance of claim 5, further comprising:

a memory associated with said control system; and a look up data table stored within said memory, wherein said look up data table contains information for converting current flow signal data to corresponding motor temperature data.

8. The washing appliance of claim 5, wherein said temperature fold back procedures comprises modifying operation of said induction motor.

9. The washing appliance of claim 5, wherein said temperature fold back procedures comprises shortening the stroke of said agitator during an agitation period of said washing cycle.

10. The washing appliance of claim 5, wherein said temperature fold back procedures comprises pausing motor operation.

11. The washing appliance of claim 5, wherein said temperature fold back procedures comprises pausing the stroke of said agitator during an agitation period of said washing cycle.

12. An induction motor, comprising:

a start winding;

a run winding;

a control system configured for selectively supplying a phase limited voltage to at least one of said start and run windings; and a current sensor coupled to said control system and to said at least one of said start and run windings for measuring current flow through said at least one of said start and run windings and sending a signal representative of measured current to said control system, wherein the supplied phase limited AC voltage is inadequate to provide starting torque for the motor, wherein said control system is further configured to convert said signal representative of measured current to a signal representative of motor temperature and to initiate temperature fold back procedures when said signal representative of motor temperature exceeds a predetermined level.

13. The induction motor of claim 12, further comprising:

a start switch; and a run switch, wherein said start switch and said run switch each comprise a Triac.

14. The induction motor of claim 12, wherein said fold back procedures comprise modifying motor operation.

15. The induction motor of claim 12, wherein said fold back procedures comprise pausing motor operation.

16. The induction motor of claim 12, further comprising, a memory associated with said control system; and a look up data table stored within said memory, wherein said look up data table contains information for converting current flow signal data to corresponding motor temperature data.

* * * * *